United States Patent [19]

Ostermeyer et al.

[11] 4,254,904

[45] Mar. 10, 1981

[54] POCKET-TYPE SIEVE CENTRIFUGE

[75] Inventors: Peter Ostermeyer, Munich; Günther Hultsch, Oberschleissheim, both of Fed. Rep. of Germany

[73] Assignee: Krauss-Maffei Aktiengesellschaft, Munich, Fed. Rep. of Germany

[21] Appl. No.: 64,586

[22] Filed: Aug. 7, 1979

[30] Foreign Application Priority Data

Aug. 7, 1978 [DE] Fed. Rep. of Germany ....... 2834491

[51] Int. Cl.[3] .......................... B04B 3/00; B04B 7/16

[52] U.S. Cl. .......................................... 233/2; 233/28

[58] Field of Search .................... 233/28, 2, 1 R, 1 D, 233/1 E, 12, 14 R, 27; 127/19, 56

[56] References Cited

U.S. PATENT DOCUMENTS

| | | | |
|---|---|---|---|
| 3,205,095 | 9/1965 | Dietzel et al. | 233/2 X |
| 3,955,754 | 5/1976 | Schaper | 233/2 |
| 3,973,984 | 8/1976 | Hentschel | 233/2 X |
| 4,036,425 | 7/1977 | Ilin et al. | 233/2 |

FOREIGN PATENT DOCUMENTS

| | | | |
|---|---|---|---|
| 2309408 | 5/1974 | Fed. Rep. of Germany | 233/2 |
| 225784 | 1/1969 | U.S.S.R. | 233/2 |
| 378255 | 6/1973 | U.S.S.R. | 233/2 |
| 389841 | 10/1973 | U.S.S.R. | 233/2 |
| 451468 | 3/1975 | U.S.S.R. | 233/2 |
| 437532 | 7/1975 | U.S.S.R. | 233/2 |

*Primary Examiner*—Stanley N. Gilreath
*Attorney, Agent, or Firm*—Karl F. Ross

[57] ABSTRACT

A pocket-type centrifuge for processing sugar-beet or cane-sugar mash has a rotor which carries an annular array of pockets whose inner portions are formed as sieves and whose outer portions are constructed to mix a wash liquid with the mash that is fed axially into the rotor and that passes radially out over the pockets. A primary filtrate can be extracted from behind the sieves of the inner portions of the pockets, and the remainder of the mash mixture is then mixed with a wash liquid fed into an annular inwardly open chamber above the rotor that feeds its liquid into the outer portions of the pockets. From the pockets the mixed wash liquid and mash is projected onto a downwardly flared skirt of the rotor, and from this skirt onto an upwardly flared outer drum that is rotated slower than the rotor. The lower portion of this drum is solid and imperforate to insure good mixing of the wash liquid and the remaining solid phase, and its upper portion is foraminous so that as the material migrates axially upwardly all of the remaining liquid is extracted from it, along with any soluble substances in the mixture. In this manner most of the liquid phase in the original mixture is extracted, undiluted, at the inner regions of the pockets, and the remaining soluble substances are leached out by the wash liquid. The solids recovered at the upper end of the outer drum are almost completely dry and free of soluble substances.

20 Claims, 6 Drawing Figures

Fig.4
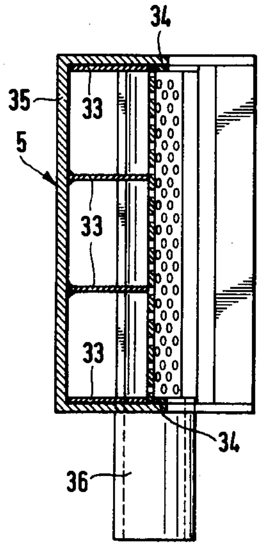
Fig.3
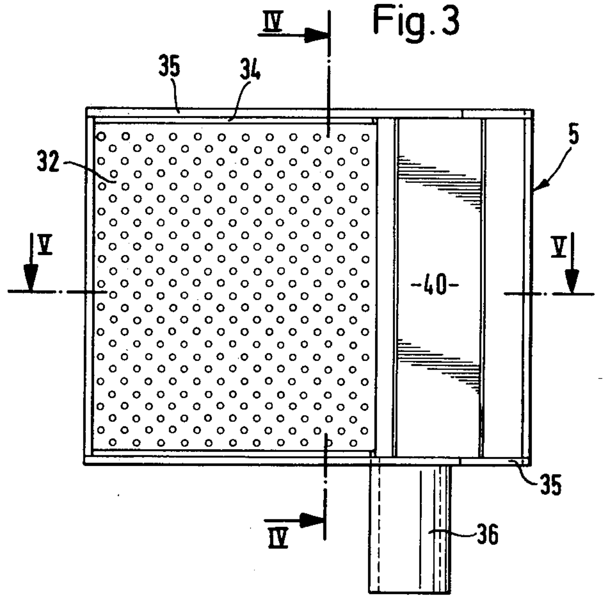
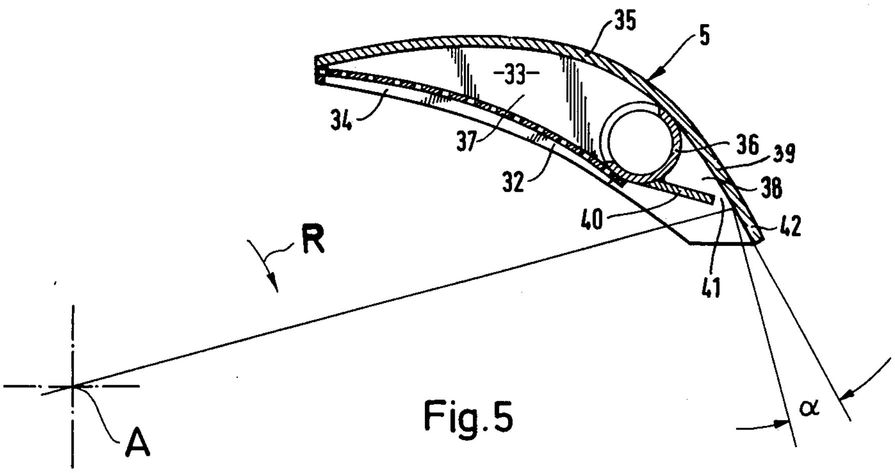
Fig.5

POCKET-TYPE SIEVE CENTRIFUGE

FIELD OF THE INVENTION

The present invention relates to a sieve centrifuge. More particularly this invention concerns a pocket-type sieve centrifuge of the type used for the continuous extraction of sugar from sugar-cane or sugar-beet pulp.

BACKGROUND OF THE INVENTION

A centrifuge of the above-described general type has a rotor normally rotatable about an upright axis and carrying an array of pockets each formed as a sieve. These pockets have sieve forward faces, relative to the rotation direction, and are arrayed at angles to respective radii through the axis. Each pocket has a drain so that a solid/liquid mixture, such as sugar-beet or sugar-cane pulp, can be charged into the center of this rotor, whereupon it will be expelled radially outwardly. The pulp will be driven centrifugally against the inclined surfaces of these pockets to move slowly radially outwardly while the liquid phase of the suspension is drawn off as a primary or mother filtrate from the drains. Ideally such a sieve centrifuge should extract virtually all of the sugar from the pulp, leaving relatively dry and sugar-free pulp or bagasse at its solids-phase output.

In German Pat. No. 1,228,199 such a centrifuge is shown which is provided with a wash-liquid input that allows the solids/liquid mixture to be washed for leaching of all of the soluble components therefrom. Such an arrangement sprays the wash liquid directly on a relatively thin layer of the mixture being centrifuged, so that the leaching effect is often inadequate. In addition size factors make it impossible to subject the mixture to sufficient centrifugal force to extract most of the liquid phase, thereby leaving the solids relatively dry. What is more the wash liquid is inherently mixed with the primary filtrate, diluting it and making subsequent concentration of this primary filtrate substantially more difficult.

In German Pat. No. 1,119,775 another pocket-type centrifuge is shown which has the advantages of a large sieve area for a relatively small unit, and wherein the pockets are individually pivotal about respective vertical axes parallel to and offset from the rotation axis of the rotor. Such an arrangement does allow the centrifuge to be adjusted to efficiently process different types of solids/liquid mixtures, but has no provision whatsoever for using a wash liquid to completely leach out soluble substances from the mixture.

The arrangement of German Pat. No. 2,031,350 has a system wherein it is possible to extract virtually all of the liquid phase from the mixture. This arrangement uses a pair of concentric rotors to obtain extremely high centrifugal forces. As the material passes from the inner to outer rotor excellent extraction of the liquid phase is assured. Such an arrangement has, however, no provision for treating the mixture with a wash liquid, so that it is unsuitable for use in a sugar centrifuge.

OBJECTS OF THE INVENTION

It is therefore an object of the present invention to provide an improved centrifuge.

Another object is to provide an improved pocket-type sieve centrifuge which is ideally suited for use in the extraction of soluble sugar from sugar-cane or sugar-beet pulp.

Yet another object is to provide such a centrifuge which at the same time prevents mixing of the primary filtrate with the wash liquid, while producing a solids output which is almost completely dry.

SUMMARY OF THE INVENTION

These objects are attained according to the instant invention in a centrifuge of the type wherein an array of pockets is carried on the rotor and each pocket has a radially inner region formed as a sieve and a radially outer region. A flared skirt is carried on this rotor, centered on the axis, and surrounds the array of pockets while axially partially overlapping this array of pockets. Thus a solids/liquid mixture can be fed into the rotor generally at the axis while it is rotated to centrifugally outwardly displace this mixture over the sieves and across the annular space formed between the outer boundary of the sieves and the skirt. During such rotation most of the liquid phase of the mixture will be extracted through the sieves formed at the inner regions of the pockets, and this liquid phase can be extracted from behind these sieves as a primary filtrate. Furthermore according to this invention the rotor is formed with an inwardly open channel that has outlets that open axially into the space formed between the outer boundary of the sieves and the skirt. A stationary wash-liquid feed pipe opens radially outwardly into this channel so that it can introduce a wash liquid into the channel, which liquid then passes through the outlets into the space to mix with that portion of the mixture that is centrifugally projected across this space. An outer flared drum surrounds the rotor and is spaced outwardly of the skirt, and is rotated at a speed different from that of the rotor, so that extremely good mixing of the wash liquid is assured both in the space between the sieve and the skirt, and as the solids phase mixed with the wash liquid passes between the skirt and the outer drum which is rotating at a rate different from that of the skirt. In this manner dissolving of all of the soluble substances in the mixture is assured.

Thus the system according to the instant invention ensures extraction of the primary filtrate with a highly efficient pocket-type centrifuge. Thereafter the remainder of the solids/liquid mixture is thoroughly mixed with a wash liquid. According to another feature of this invention the drum is provided at a location offset from that location where the mixture is projected radially onto it as a sieve. This outer drum is rotated more slowly than the rotor so that, as the mixture moves axially along it under the effect of centrifugal force, the liquid phase remaining in it can be thoroughly extracted from it, insuring that by the time the mixture reaches the wide-end edge of the outer drum virtually all of its liquid phase, including the wash liquid added to it, will have been extracted.

The use of two separately driven parts—the rotor and the outer drum—allows the centrifuge to be adjusted to operate with maximum efficiency for various different types of mixtures. The inner rotation speed is adjusted to obtain the desired amount of primary-filtrate extraction consonant with sufficient throughput through the centrifuge, as the rotation speed is linked not only to the amount of extraction, but to the speed with which the material passes through the center rotor. Normally the outer rotor is operated at a somewhat lower rotation rate, to obtain adequate centrifugal force at this outer drum to insure good separation of the remaining liquid phase from the solids. The difference in rotation speeds insures that as the material is projected from the rotor to the outer drum it will be thoroughly mixed and tumbled with the wash liquid, ensuring that all soluble substances will be given adequate time to dissolve in the wash liquid. Furthermore the liquid phase, which moves considerably faster than the solids phase in the outer drum, will flow a considerable distance through the solids phase, insuring extremely good treatment of this solids phase.

According to further features of this invention a second wash liquid is sprayed on the outer drum, and the machine has over all three separate outputs: a primary-filtrate output, a wash-liquid output for a solution of considerably lower concentration than the primary filtrate, and a solids output. As the primary filtrate is in no way diluted, it can easily be refined at minimum cost. The wash-liquid output, which will be considerably enriched in soluble substances, can either be concentrated for extraction of its soluble substances or can be used at other stages in the treatment process. The solids phase can normally be used practically as is, as it is almost completely dry at the solids output of the centrifuge.

According to further features of this invention the pockets are each formed as a solid outer wall that is curved, and a front wall formed at the inner radial regions as a sieve. This pocket is divided into a pair of compartments, the inner compartment behind the sieve being provided with a drain for the primary filtrate, and the outer compartment can be connected to one of the outlets for the wash liquid. Thus as the material migrates radially across the inner wall of the pocket its primary filtrate will first be extracted, then it will be mixed with the wash liquid before being projected radially onto the skirt and thence radially onto the outer drum.

In accordance with this invention the machine is charged through an axially extending feed pipe that opens at a stack of disks that are perpendicular to the axis and spaced axially apart. These disks can have center holes of decreasing diameter away from the mouth of the feed pipe. The axial spacing between these disks acts as a sort of filter, preventing any large objects likely to damage the centrifuge from being processed, as such large objects will remain caught at the axial center of the device. In fact the arrangement can be set up with another annular compartment open inwardly to catch such large objects and prevent them from damaging the various moving parts.

The outer portion of each of the pockets, which is the region where the mixture is mixed with the wash liquid after having had most of its liquid phase stripped from it in the inner portion of the respective pocket, forms an angle with a perpendicular to a respective radius of the axis that is smaller than the slide or heap angle of the material. Similarly the flare angles of the skirt and of the outer drum at the region of the rotor are smaller than this heap angle, so that the material moves slowly through the drum, effectively being washed along by the added wash liquid. Furthermore the inner portion of each of the pockets has an overall length which is at least twice that of the outer portions, so that as much as possible of the primary filtrate can be extracted before the remaining soluble substances are leached out of the mixture by the wash liquid.

BRIEF DESCRIPTION OF THE DRAWING

FIG. 3 is a large-scale side view of a sieve pocket according to this invention; and FIGS. 4 and 5 are sections taken respectively along lines IV—IV and V—V of FIG. 3.

SPECIFIC DESCRIPTION

Figure 1A:
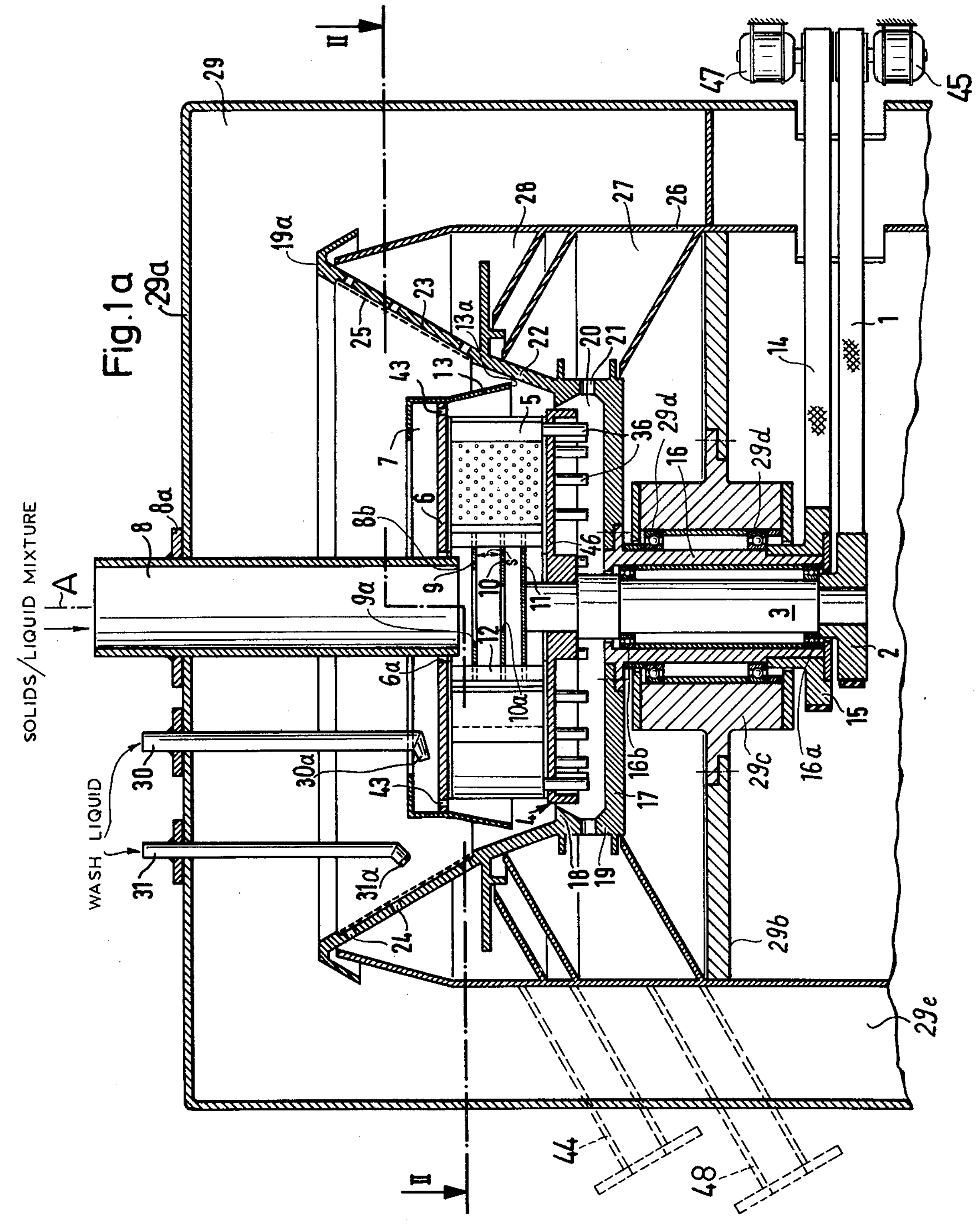
FIG. 1*a* is a vertical section through a centrifuge according to this invention.

A centrifuge according to the instant invention as shown in FIG. 1*a* is centered on a vertical axis A and has a rotor indicated generally at 4 and carried on a core shaft 3 keyed at one end to a pulley 2 drivable by means of a belt 1 from a motor 45. This rotor 4 has a base plate 46 and a top plate 6 that axially flank an annular array of identical sieve pockets 5 which will be described in greater detail below.

The top plate 6 of the rotor 4 is formed with a central throughgoing hole **6*a* and forms one wall of an inwardly open annular channel 7 whose function will also be described below. A fill tube 8 secured at a flange 8*a* to a top wall 29*a* of a housing 29 of the centrifuge extends axially through the hole 6*a*. The plates 6 and 46 are bridged by an annular array of axially extending scoop-shaped webs or ribs 12 supporting three disks 9, 10 and 11 extending in respective planes perpendicular to the axis A. The uppermost disk 9 is spaced slightly below the mouth 8*b* of the fill pipe 8 and is formed with a central hole 9*a* slightly smaller than the inner diameter of the pipe 8. The intermediate disk 10 has a central hole 10*a* which is slightly smaller than the hole 9*a*, and the lower disk 11 is solid. Thus material coming into the centrifuge through the pipe 8 will be distributed by the plates 9, 10 and 11 to move outwardly across the pockets 5. Any large foreign objects being fed in through the pipe 8 will not be able to pass outwardly between the disks 9, 10 and 11 if their diameters are larger than the spacing s between these disks. Thus the pockets 5 can be protected against being damaged by such foreign objects. It is also within the scope of this invention to provide a separate annular inwardly open chamber such as shown at 7** to catch such foreign objects.

Attached to the top plate 6 of the rotor 4 is a downwardly flared skirt 13 extending downwardly through a distance d (see FIG. 1*b*) which is equal to slightly more than one half the distance D which is the axial height of the pockets 5 which fit snugly between the walls 6 and 46. This skirt 13 has an upward extension which forms the inwardly open channel 7. A tube shaft 16 supports the core shaft 3 via bearings **16*a* and 16*b* and is itself supported via bearings 29*d* on a hub 29*c* of a floor 29*b* of the housing 29. This tube shaft 16 is keyed at one end to a pulley 15 drivable from a motor 47 through a belt 14. The rotation speeds, and even the rotation directions if desired, of the two shafts 3 and 16 can be different. This shaft 16 is rigidly fixed to a lower plate 17 of an outer drum 19 that is centered on the axis A and that has an inwardly directed ridge 18 forming an annular chamber 20 that is radially outwardly open through holes 21 into an annular compartment 27 formed within a wall 26 of the housing and provided with an outlet indicated at 48**.

Above this inwardly open channel 20 the outer drum 19 is formed with a frustoconically flared portion 22 whose half angle is equal to somewhat less than the heap, friction, or slippage angle for the material to be processed by the device. This wall portion 22 is solid and imperforate and is aligned between the edge 13*a* of the skirt 13 and the bottom plate 6. Above this portion 22 the outer drum 19 has a further portion 23 provided with a screen 25 and having throughgoing holes 24 that open into another annular collection chamber 28 provided with a drain 44. This upper portion 23 therefore is foraminous, but has a half angle greater than the heap angle of the material being treated.

The device is provided with a first wash-liquid intake pipe 30 which is fixed in the upper wall 29*a* of the housing and which has an outlet end 30*a* which opens radially outwardly into the annular channel 7. Another intake pipe 31 has an outlet end 31*a* which is directed at the upper foraminous wall portion 23 of the outer drum 19.

Referring now more specifically to FIGS. 3–4, each of the pockets can be seen to comprise a rear wall 35 of arcuate shape, and top and bottom walls 34 forming an inwardly open channel. A drain 36 extends downwardly below the lower wall 34 and subdivides this channel into an inner compartment 37 having a foraminous front wall 32 and outer compartment 38 partly covered by a small cover plate 40 which forms an extension of the foraminous front wall. Actually the foraminous front wall 32 is carried on ribs 33 between edges 34 thereof so that it is well supported on the rear wall 35. The rear wall 35 in turn has a portion 39 forming the rear wall of the compartment 38 and forming an outlet gap 41 with the plate 40.

Figure 1B:
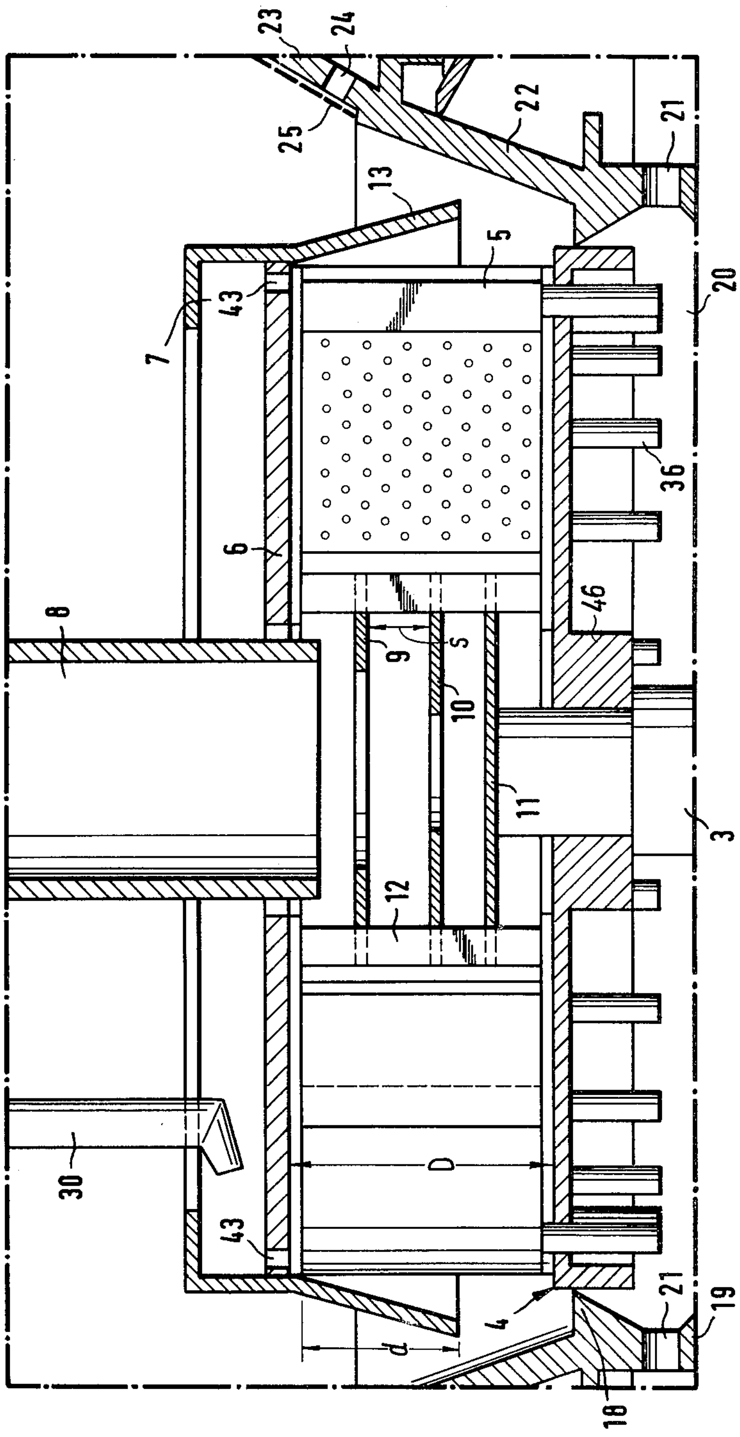
FIG. 1*b* is a large-scale view of a detail of a centrifuge slightly different from that of FIG. 1*a;*
Figure 2:
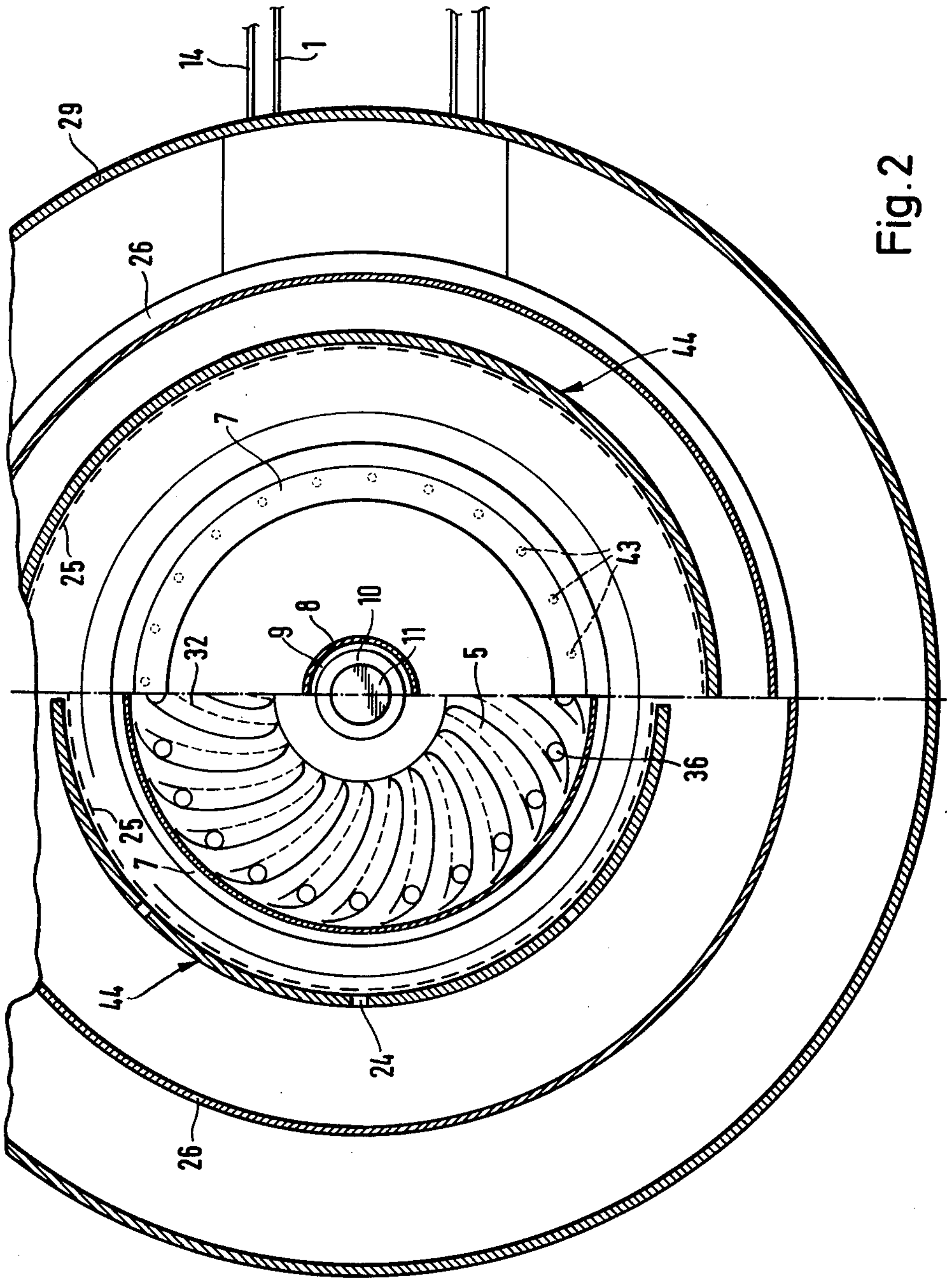
FIG. 2 is a section taken along line II—II of FIG. 1*a;*

An adjustable edge strip may be provided to allow adjustment of the size of the gap 41. The edge 42 of this extension 39 forms an angle $\alpha$ with a perpendicular to a radius from the axis A which is smaller than the slippage or heap angle of the material to be processed. As shown in FIG. 1*a* the upper plate 6 of the rotor 4 is formed with an array of through-going holes 43 which open slightly outwardly of the pockets 5 into the space defined between them and the skirt 13. In FIG. 1*b*, however, the holes 43 open directly into the upper ends of the outer compartments 38, to which purpose aligned holes are formed in the upper walls 35.

The pockets 5 are curved and are concave generally forwardly relative to the rotation direction R of the rotor 4 about the axis A. Furthermore each of the chambers 37 is substantially twice as long as the respective chamber 38. These pockets 5 are easily set axially in place in the lower plate 46 of the rotor 4.

The apparatus described above is normally used for extracting sugar from sugar-cane or sugar-beet pulp which is fed in via the fill pipe 8. As described above foreign objects having a diameter greater than the distance s will be prevented from moving radially outwardly where they could damage the relatively fragile front walls 32 of the pockets 5. The pulpy and wet material will be projected against the inner edges of these pockets 5 and will migrate radially outwardly along the foraminous walls 32 thereof. This will extract a large portion of the liquid phase from the mixture, which phase will be collected inside the compartment 37 to run out via the drains 36. Thence the liquid is sprayed radially outwardly in the collection compartment 20, then radially outwardly into the collection compartment 27, whereupon it can be drawn off via the primary-filtrate outlet 48. The primary filtrate recovered at the outlet 48 will be undiluted and relatively easy to process into high-quality refined sugar.

Meanwhile the tube 30 is injecting wash liquid into the annular distributing channel 7. This liquid moves through the outlets 43 either directly into the compartments 38 or into the region between the skirt 13 and the pockets 5. As the partially dried mixture moves along the wall 40 it will, therefore, be thoroughly mixed with this wash liquid. The mixture of the solid phase and the wash liquid will then be projected radially off onto the inner wall of the skirt 13 to further intensify this mixing. This skirt 13 has a half angle which is, once again, smaller than the heap angle of the material so that this material will effectively be washed along by the liquid in it.

As the material is projected centrifugally off the wide-end edge 13*a* of the flared skirt 13 it will again mix effectively with the wash liquid, and as it is spread about the nonforaminous wall portion 22 of the outer drum 19 this mixing will continue. The material will then migrate up the wall 22 and onto the foraminous wall portion 23 where it is sprayed with further wash liquid by the pipe 31. The liquid extracted from the collection compartment 28 via the outlet 44 will have a substantially lower concentration than the primary filtrate, but will contain virtually all of the soluble substances in the sugar pulp. The rotation rate of the outer drum 19 is normally substantially lower than that of the rotor 4 so that the centrifugal force of it is sufficient to almost completely extract the liquid phase from the mixture. The material that eventually flows over the upper wide-edge 19*a* of the outer drum 19, will therefore, be virtually dry, and will fall down in a collection compartment 29*e* defined between the housing 29 and the wall 26.

Thus the centrifuge according to the instant invention will effectively remove all of the liquid phase and soluble substance from sugar-beet or sugar-cane pulp or mash. The primary filtrate will be virtually undiluted for easiest possible concentration into refined sugar. At the same time the solid phase recovered will contain virtually no soluble substances, so can be readily processed into usable building material or animal fodder. The wash liquid recovered from the compartment 28 can be concentrated if desired, or can be used at other stages in the treatment process.

We claim:

1. A centrifuge comprising:

a rotor rotatable about an axis;

an array of pockets carried on said rotor and centered on said axis, said pockets each having a radially inner region formed as a sieve and a radially outer region;

a flared skirt carried on said rotor, centered on said axis, surrounding said array of pockets, axially partially overlapping said array of pockets, and forming an annular space between said skirt and said sieves;

means for feeding a solids/liquid mixture into said rotor generally at said axis;

means for rotating said rotor and thereby centrifugally outwardly displacing said mixture over said sieves and across said space with concomitant filtering of at least part of the liquid phase of said mixture through said sieves;

means for extracting said liquid phase from behind said sieves as a primary filtrate;

an inwardly open channel carried on said rotor and having outlets opening axially into said space;

means including a stationary wash-liquid feed pipe opening radially into said channel for introducing a wash liquid into said channel and then passing said liquid through said outlets into said space to mix with the portion of said mixture being centrifugally projected across said space;

an outer flared drum rotatable about said axis independently of said rotor, spacedly surrounding said skirt, and having a wide-end edge; and means for rotating said drum independently of said rotor and thereby displacing said portion of said mixture axially along said drum with at least the solid phase of said portion being projected centrifugally outwardly from said wide-end edge.

2. The centrifuge defined in claim 1 wherein said pockets have a predetermined axial dimension and said skirt overlaps said pockets by a distance equal to at least half of said dimension.

3. The centrifuge defined in claim 1 wherein said skirt has a skirt edge and said rotor has a base plate spaced therefrom, said drum having a solid and imperforate annular wall section radially aligned between said base plate and said skirt edge with said pockets and a foraminous annular wall section between said solid section and said wide-end edge, whereby at least part of the remaining liquid phase and wash liquid will be filtered out of said portion of said mixture at said foraminous section.

4. The centrifuge defined in claim 3, wherein said imperforate wall section has a half angle equal to less than the heap angle of said mixture.

5. The centrifuge defined in claim 4 wherein said foraminous wall section has a half angle equal to more than said heap angle.

6. The centrifuge defined in claim 1 wherein said outlets open at said radially outer portions of said pockets.

7. The centrifuge defined in claim 6 wherein said pockets are each subdivided into an inner compartment having an axial primary-filtrate drain forming part of said means for extracting and an outer compartment into which the respective outlet opens.

8. The centrifuge defined in claim 7 wherein said drains are pipes inclined slightly to said axis.

9. The centrifuge defined in claim 7 wherein said outer drum forms another inwardly open channel level with said drains and constituting part of said means for extracting.

10. The centrifuge defined in claim 7 wherein said pockets have at said outer compartments substantially solid and imperforate outer walls defining with a perpendicular to a radius of said axis an angle smaller than the heap angle of said mixture.

11. The centrifuge defined in claim 1 wherein said skirt has a flare angle at least in a region level with said pockets that is smaller than the heap angle of said mixture.

12. The centrifuge defined in claim 1 wherein said pockets are each subdivided internally into an inner sieve compartment and an outer compartment, said inner compartments being elongated in directions perpendicular to said axis and being substantially longer in the respective directions than the respective outer compartments.

13. The centrifuge defined in claim 12 wherein said inner compartments are at least twice as long as the respective outer compartments.

14. The centrifuge defined in claim 1 wherein said means for feeding includes an axially extending pipe having a mouth opening at said axis in said rotor and a stack of annular disks lying substantially perpendicular to said axis, having outer peripheries fixed to said rotor, spaced axially apart, and having inner peripheries of diameters smaller than the inside diameter of said axially extending pipe at said mouth.

15. The centrifuge defined in claim 14 wherein said stack of disks includes a disk further from said mouth than said other disks which is not annular but which is solid, the diameters of said inner peripheries decreasing away from said mouth.

16. The centrifuge defined in claim 14 wherein said disks are spaced axially apart from one another and from said mouth by a predetermined maximum spacing substantially smaller than said diameters but larger than said spacing will be caught by said disks and prevented from traveling outwardly therebetween.

17. The centrifuge defined in claim 14 wherein said rotor has ribs extending generally parallel to said axis and connected to said outer peripheries.

18. The centrifuge defined in claim 17 wherein said ribs are scoop-shaped.

19. The centrifuge defined in claim 1 wherein said skirt and drum are oppositely flared, whereby said mixture changes axial direction when moving from said skirt to said drum.

20. The centrifuge defined in claim 1 wherein said pockets are concave forwardly relative to the normal direction of rotation of said rotor.

* * * * *